United States Patent
Ciudad et al.

(10) Patent No.: US 8,199,249 B2
(45) Date of Patent: *Jun. 12, 2012

(54) IMAGE CAPTURE USING DISPLAY DEVICE AS LIGHT SOURCE

(75) Inventors: Jean-Pierre Ciudad, San Francisco, CA (US); Alexandre Aybes, San Francisco, CA (US); Peter Westen, Mountain View, CA (US); Gregory N. Christie, San Jose, CA (US); Scott Forstall, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/688,828

(22) Filed: Jan. 15, 2010

(65) Prior Publication Data

US 2010/0118179 A1    May 13, 2010

Related U.S. Application Data

(63) Continuation of application No. 11/249,130, filed on Oct. 11, 2005, now Pat. No. 7,663,691.

(51) Int. Cl.
*H04N 5/222* (2006.01)
(52) U.S. Cl. ............... 348/371; 348/216.1; 348/227.1; 348/333.01
(58) Field of Classification Search ............ 348/216.1, 348/227.1, 333.01, 370
See application file for complete search history.

(56) References Cited

U.S. PATENT DOCUMENTS

| | | |
|---|---|---|
| 4,881,127 A | 11/1989 | Isoguchi et al. |
| 5,262,815 A | 11/1993 | Aumiller |
| 5,402,513 A | 3/1995 | Schafer |
| 5,459,529 A | 10/1995 | Searby et al. |
| 5,519,828 A | 5/1996 | Rayner |
| 5,534,917 A | 7/1996 | MacDougall |
| 5,670,985 A | 9/1997 | Cappels, Sr. et al. |
| 5,687,306 A | 11/1997 | Blank |
| 5,726,672 A | 3/1998 | Hernandez et al. |
| 5,737,552 A | 4/1998 | Lavallee et al. |
| 5,748,775 A | 5/1998 | Tsuchikawa et al. |
| 5,752,029 A | 5/1998 | Wissner |
| 5,778,108 A | 7/1998 | Coleman, Jr. |
| 5,781,198 A | 7/1998 | Korn |
| 5,812,787 A | 9/1998 | Astle |
| 5,854,893 A | 12/1998 | Ludwig et al. |

(Continued)

FOREIGN PATENT DOCUMENTS

EP    1 217 598    6/2002

(Continued)

OTHER PUBLICATIONS

"20/20 Color MD™ Because it's more fun taking photos than fixing photos", retrieved from the Internet at URL: <http://www.phototune.com/2020_intro.html>, 2005.

(Continued)

*Primary Examiner* — Gevell Selby
(74) *Attorney, Agent, or Firm* — Fish & Richardson P.C.

(57) ABSTRACT

A digital image capture system and method uses a display device to illuminate a target with light for improved image capture under poor lighting conditions. Various characteristics of the flash (e.g., brightness, color, duration, etc.) can be adjusted to improve image capture. Users are provided with feedback (e.g., live video feed, audio and/or visual countdowns, etc.) to assist them in preparing for image capture. The captured images are seamlessly integrated with existing applications (e.g., video conferencing, instant text messaging, etc.).

21 Claims, 5 Drawing Sheets

Digital Image Capture System
100

U.S. PATENT DOCUMENTS

| | | | |
|---|---|---|---|
| 5,914,748 A | 6/1999 | Parulski et al. |
| 5,923,791 A | 7/1999 | Hanna et al. |
| 5,956,026 A | 9/1999 | Ratakonda |
| 5,995,095 A | 11/1999 | Ratakonda |
| 6,064,438 A | 5/2000 | Miller |
| 6,111,562 A | 8/2000 | Downs et al. |
| 6,148,148 A | 11/2000 | Wain et al. |
| 6,230,172 B1 | 5/2001 | Purnaveja et al. |
| 6,237,025 B1 | 5/2001 | Ludwig et al. |
| 6,298,197 B1 | 10/2001 | Wain et al. |
| 6,307,550 B1 | 10/2001 | Chen et al. |
| 6,344,874 B1 | 2/2002 | Helms et al. |
| 6,351,762 B1 | 2/2002 | Ludwig et al. |
| 6,400,374 B2 | 6/2002 | Lanier |
| 6,414,707 B1 | 7/2002 | Agraharam et al. |
| 6,434,266 B1 | 8/2002 | Kanno et al. |
| 6,507,286 B2 | 1/2003 | Weindorf et al. |
| 6,583,799 B1 | 6/2003 | Manolis et al. |
| 6,583,806 B2 | 6/2003 | Ludwig et al. |
| 6,594,688 B2 | 7/2003 | Ludwig et al. |
| 6,624,828 B1 | 9/2003 | Dresevic et al. |
| 6,714,216 B2 | 3/2004 | Abe |
| 6,715,003 B1 | 3/2004 | Safai |
| 6,716,103 B1 | 4/2004 | Eck et al. |
| 6,760,042 B2 | 7/2004 | Zetts |
| 6,912,327 B1 | 6/2005 | Hori et al. |
| 6,933,979 B2 | 8/2005 | Gonzales et al. |
| 6,954,894 B1 | 10/2005 | Balnaves et al. |
| 6,988,244 B1 | 1/2006 | Honda et al. |
| 6,988,248 B1 | 1/2006 | Tang et al. |
| 7,030,872 B2 | 4/2006 | Tazaki |
| 7,064,492 B1 | 6/2006 | Vijeh |
| 7,095,392 B2 | 8/2006 | Lin |
| 7,095,395 B2 | 8/2006 | Bu |
| 7,103,840 B2 | 9/2006 | Ihara et al. |
| 7,124,366 B2 | 10/2006 | Foreman et al. |
| 7,127,149 B1 | 10/2006 | Lin |
| 7,152,093 B2 | 12/2006 | Ludwig et al. |
| 7,165,219 B1 | 1/2007 | Peters et al. |
| 7,206,809 B2 | 4/2007 | Ludwig et al. |
| 7,284,207 B2 | 10/2007 | Canfield et al. |
| 7,421,470 B2 | 9/2008 | Ludwig et al. |
| 7,433,921 B2 | 10/2008 | Ludwig et al. |
| 7,546,537 B2 | 6/2009 | Crawford |
| 7,546,544 B1 | 6/2009 | Weber et al. |
| 7,739,599 B2 | 6/2010 | Patten et al. |
| 2002/0019833 A1 | 2/2002 | Hanamoto |
| 2002/0105589 A1 | 8/2002 | Brandenberger et al. |
| 2002/0140740 A1 | 10/2002 | Chen |
| 2002/0167540 A1 | 11/2002 | Dobbelaar |
| 2002/0180803 A1 | 12/2002 | Kaplan et al. |
| 2002/0194195 A1 | 12/2002 | Fenton et al. |
| 2002/0198909 A1 | 12/2002 | Huynh et al. |
| 2003/0046348 A1 | 3/2003 | Pinto et al. |
| 2003/0047099 A1 | 3/2003 | Hanyu |
| 2003/0067435 A1 | 4/2003 | Liu |
| 2003/0090507 A1 | 5/2003 | Randall et al. |
| 2003/0189588 A1 | 10/2003 | Girgensohn et al. |
| 2003/0193520 A1 | 10/2003 | Oetzel |
| 2003/0210261 A1 | 11/2003 | Wu et al. |
| 2004/0008208 A1 | 1/2004 | Dresevic et al. |
| 2004/0017390 A1 | 1/2004 | Knowlton et al. |
| 2004/0021684 A1 | 2/2004 | Miller |
| 2004/0032497 A1 | 2/2004 | Ying et al. |
| 2004/0085340 A1 | 5/2004 | Dimitrova et al. |
| 2004/0100497 A1 | 5/2004 | Quillen et al. |
| 2004/0125124 A1 | 7/2004 | Kim et al. |
| 2004/0196250 A1 | 10/2004 | Mehrotra et al. |
| 2004/0227751 A1 | 11/2004 | Anders |
| 2004/0233125 A1 | 11/2004 | Tanghe et al. |
| 2004/0239799 A1 | 12/2004 | Suzuki et al. |
| 2005/0073575 A1 | 4/2005 | Thacher et al. |
| 2005/0117811 A1 | 6/2005 | Hoshino |
| 2005/0174440 A1 | 8/2005 | Kim |
| 2005/0174589 A1 | 8/2005 | Tokiwa |
| 2005/0194447 A1 | 9/2005 | He et al. |
| 2006/0018653 A1 | 1/2006 | Kido |
| 2006/0050151 A1 | 3/2006 | Fujinawa |
| 2006/0055828 A1 | 3/2006 | Henry et al. |
| 2006/0088275 A1 | 4/2006 | O'Dea et al. |
| 2006/0274161 A1 | 12/2006 | Ing et al. |
| 2006/0284895 A1 | 12/2006 | Marcu et al. |
| 2007/0009028 A1 | 1/2007 | Lee et al. |
| 2007/0081740 A1 | 4/2007 | Ciudad et al. |
| 2007/0113181 A1 | 5/2007 | Blattner et al. |

FOREIGN PATENT DOCUMENTS

| | | |
|---|---|---|
| EP | 1 775 939 | 4/2007 |
| JP | 2002-335432 | 11/2002 |
| JP | 2004-180245 | 6/2004 |
| JP | 2004-187154 | 7/2004 |
| JP | 2004-260560 | 9/2004 |
| JP | 2004-286781 | 10/2004 |
| JP | 2004-349843 | 12/2004 |
| JP | 2004-350208 | 12/2004 |
| JP | 2005-241814 | 9/2005 |
| JP | 2007-110717 | 4/2007 |
| WO | WO 2004/054239 | 6/2004 |

OTHER PUBLICATIONS

J.R. Appelgate, "Vivid Details' Test Strip 3.01 Redefining the Art of Image Enhancement", retrieved from the Internet at URL: <http://www.edigitalphoto.com/accessories/0101edp_vivid/index.html >, 2001.

"Skin Tune™ Photoshop Plug-in That Automatically Corrects Skin Color", retrieved from the Internet at URL: <http://www.skintune.com>, 2005.

"Welcome to Mac OS X" (slide presentation), Apple Computer, Inc.., 2002, 21 pages.

Stone, "iDVD 2—OS 10.1", retrieved from the Internet on Aug. 15, 2009 at URL: <http://www.kenstone.net/fcp_homepage/basic_idvd_2.html>, Dec. 17, 2001.

Digital Image Capture System
100

IMAGE CAPTURE USING DISPLAY DEVICE AS LIGHT SOURCE

CROSS-REFERENCE TO RELATED APPLICATIONS

This application is a continuation application and claims the benefit of priority under 35 U.S.C. Section 120 of U.S. application Ser. No. 11/249,130, filed on Oct. 11, 2005, entitled "Image Capture Using Display Device as Light Source,". The disclosure of the prior application is considered part of and is incorporated by reference in the disclosure of this application.

This application is related to the following U.S. patent applications, each of which is incorporated by reference herein in its entirety:

U.S. patent application Ser. No. 11/248,630, filed Oct. 11, 2005, entitled "Image Capture and Manipulation Based on Streaming Data,"; and U.S. patent application Ser. No. 11/153,959, filed Jun. 15, 2005, entitled "Dynamic Gamma Correction,".

TECHNICAL FIELD

The disclosed implementations relate to the capture of digital images.

BACKGROUND

Videoconferencing is one of the fastest growing segments of the computer industry. This growth is based in part on affordable digital video cameras. Digital video cameras (e.g., "WebCams") can be integrated with personal computers and displays to enable users to videoconference from a variety of locations (e.g., home, office, hotels, subway trains, etc.) Unfortunately, each location has its own unique lighting conditions, which may not be ideal for capturing quality digital images.

Some digital video cameras include a built-in flash that is automatically triggered in low-light conditions. These cameras, however, do not allow the user to control the characteristics of the flash (e.g., intensity, duration, color, etc.) based on ambient light conditions, and therefore tend to capture images that are too dark or too bright, even when operated in adequate lighting conditions.

For those millions of users who are not fortunate to own a camera with built-in flash (or external flash), the only recourse is to move to a different environment or improve the lighting conditions of the current environment. In some environments, however, the user may not have control over the lighting conditions (e.g., a public building, train, hotel, etc.).

SUMMARY

An improved digital image capture system and method uses a display device to illuminate a target with light for improved image capture under poor lighting conditions. Various characteristics of the flash (e.g., brightness, color, duration, etc.) can be adjusted to improve image capture. In some implementations, the system provides users with feedback (e.g., live video feed, audio and/or visual countdowns, etc.) to assist them in preparing for image capture. The captured images are seamlessly integrated with existing applications (e.g., video conferencing, instant text messaging, etc.).

In some implementations, a method of capturing a digital image includes: receiving an instruction to illuminate a target to facilitate capturing a digital image; and illuminating the target using a display device.

In some implementations, a method of capturing a digital image includes: receiving an instruction to acquire an image using an image capture device; determining when to flash a display device to illuminate the target; flashing the display device at the determined time; and acquiring an image illuminated by the flash using the image capture device.

In some implementations, a method of capturing digital images includes: illuminating a target with light emitted from a display device; and capturing a digital image of the illuminated target.

In some implementations, a method of capturing digital images includes: illuminating a target with light emitted from a display device; determining if the light has reached a threshold intensity level; and capturing the digital image of the target if the light has reached the threshold intensity level.

Various other implementations are described herein, including but not limited to implementations associated with computer-readable mediums, systems and devices.

The disclosed implementations provide one or more advantages over conventional digital capture systems and methods, including but not limited to: 1) illuminating a target in poor lighting conditions for improved image capture; 2) adjusting characteristics of the flash (e.g., intensity, duration, color, etc.) for improved image capture; 3) providing feedback to the user to assist the user in preparing for image capture; and 4) providing for seamless porting of captured images into other applications.

DETAILED DESCRIPTION

System Overview

Figure 1:
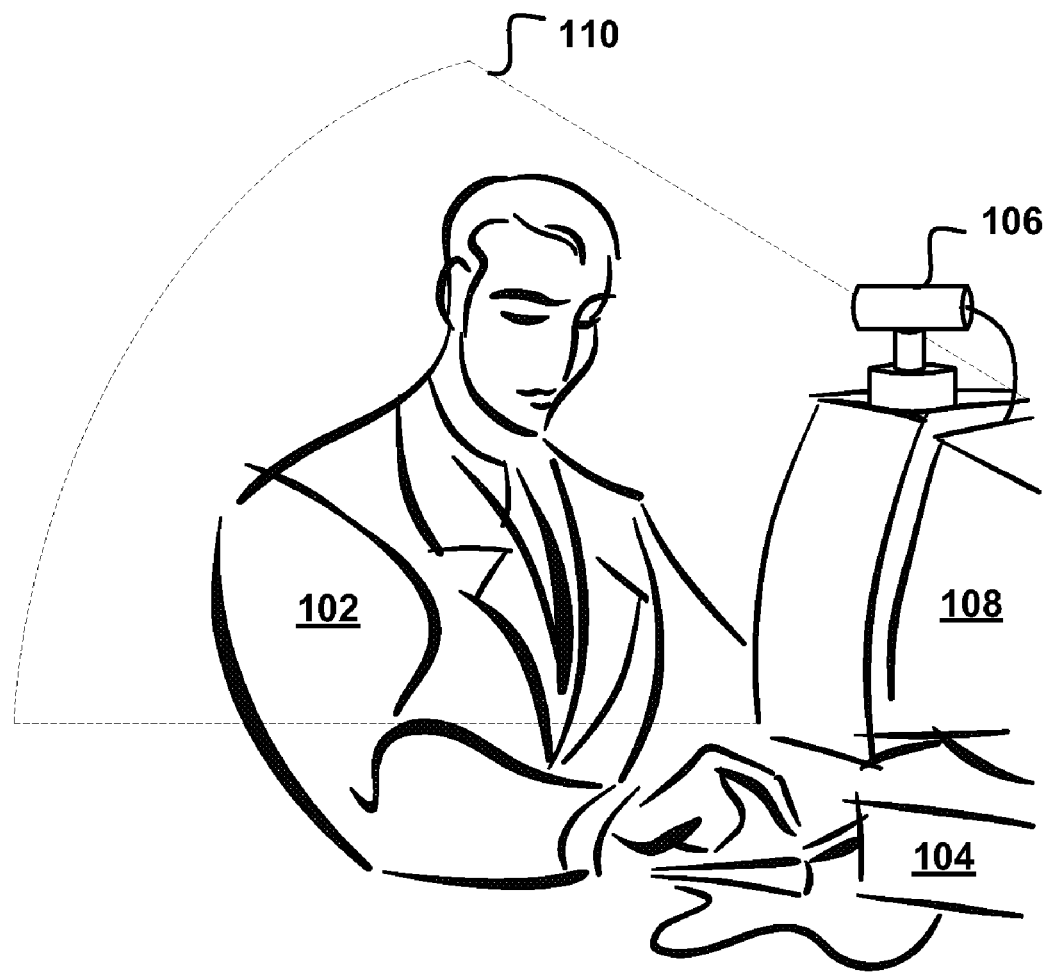
FIG. 1 illustrates the use of an improved image capture system.
Figure 2:
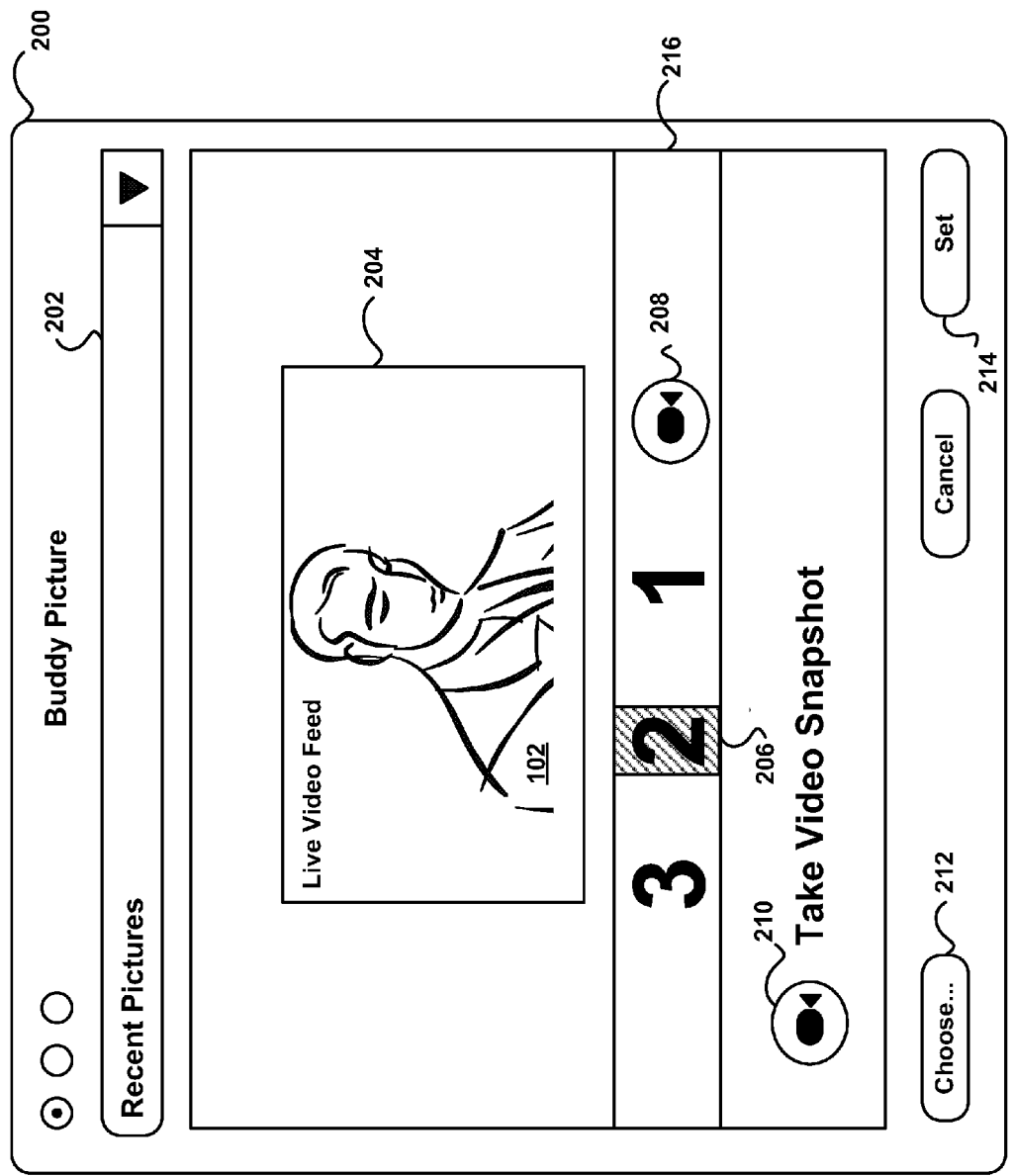
FIG. 2 illustrates a user interface for the improved image capture system shown in FIG. 1.

FIGS. 1 and 2 illustrate the use of an improved digital image capture system 100. In some implementations, the system 100 includes a device 104 (e.g., a personal computer, notebook computer, mobile phone, media player, personal digital assistant (PDA), embedded device, consumer electronic device, etc.) coupled to (or integrated with) an image capture device 106 (e.g., a digital video camera).

In operation, a user 102 sits facing a display device 108 (e.g., a CRT, LCD, etc.) which includes a screen for presenting a user interface 200. As shown in FIG. 2, the image capture device 106 (e.g., a video camera) generates a live video feed which is presented in a window 204 of the user interface 200. The user interface 200 enables the user 102 to take a "snapshot" of the live video feed, commonly known as "frame grabbing." To take a "snapshot" the user clicks the object 210 (e.g., a software button) which starts a countdown sequence. When the sequence expires one or more frames of the live video feed are captured or grabbed from an image stream or image processing pipeline. In some implementations, a still digital camera is used to capture a still shot when the sequence expires.

The countdown sequence gives the user 102 time to prepare for the picture and can be set to any desired duration (e.g., 3 sec). In some implementations, the device 104 provides visual and/or audio feedback in the form of a countdown sequence (e.g., live video feed, audio, etc.). For example, when the user 102 clicks the object 210, numerical values on a countdown display 216 are highlighted in succession to indicate the current count. In some implementations, audio files (e.g., .wav files) are played with the countdown sequence. For example, an audible "beep" (or other audio effect) can be played each time the shade box 206 passes over a number in the countdown display 216. When the last value 208 of the count is reached (shown as a camera icon), the screen of the display device 108 is flashed and a digital image is captured and displayed in window 204. In other implementations, the countdown numbers themselves are altered and/or augmented (e.g., highlighted, flashed, etc.) to simulate a countdown sequence. In some implementations, a flashing lamp on the user interface 200 simulates the cadence of the countdown sequence.

It should be apparent that any audio, visual or physical feedback (e.g., force feedback, synthetic speech, etc.) can be used to simulate a countdown sequence and to alert the user 102 when their image is about to be captured.

In some implementations, the device 104 enables a user 102 to capture an image from a video stream stored at the device 104 or from another device (e.g., a video broadcast over the Internet). For example, the user 102 can click the object 212 which invokes a file directory that the user 102 can browse for video files stored at the device 104 or on a network (e.g., the Internet, intranet, wireless network, etc.).

Target Illumination

In some implementations, the system 100 is located in a poorly lit environment (e.g., an office, hotel, train, etc.). Such poor lighting conditions make it difficult to capture quality digital images. In such environments, the system 100 can be configured to illuminate a target (e.g., the user 102) by controlling the color and brightness of the screen of the display device 108. For example, by presenting an all white background on the screen and increasing the brightness of the screen, the target is illuminated by white light 110 emitted from the screen of the display device 108. If a rapid adjustment in brightness is timed with an image capture (and sound effects), then the display device 108 can simulate a "photo flash." Thus, by flashing the screen of the display device 108, a user 102 can improve the quality of images captured in poor lighting conditions. The flash can be automatically enabled based on detected ambient light or manually enabled and disabled by a user 102 via a user interface element or preference pane accessed via the user interface 200. In some implementations, shadows can be lightened by enabling the flash even when there is enough light to capture the image (e.g., "fill flash").

The captured image can be used in any application that uses digital images, including but not limited to video conferencing and instant text messaging applications. For example, the user 102 can click the object 214 to set the captured image to be, for example, a "buddy icon" picture for Apple Computer's iChat® application.

In some implementations, the user 102 can review a representation of recent images by clicking on the object 202. In other implementations, clicking on the object 202 directs the user 102 to a file directory that can be browsed by the user 102 for files containing images (e.g., thumbnail images). The images can be presented on the user interface 200 in any desired order based on sorting criteria (e.g., date, subject matter, etc.) and can include identifying information (e.g., timestamp, size, resolution, description, etc.). In some implementations, clicking on an image in the file directory causes the image to be presented on the user interface 200 adjacent to the recently captured image, so that a user 102 can compare the quality of the newly captured image with the stored image.

In some implementations, the device 104 controls one or more aspects of the image capture device 106. For example, the device 104 can be configured to control the shutter speed of the image capture device 106, which when combined with a flash can improve the sharpness of the captured image. The device 104 can also initialize a self-timer in the image capture device 106 for controlling image capture time. For example, the device 104 can compute an absolute image capture time in the future which takes into account frame latency and other factors, then sends that value to the image capture device 106 (e.g., a still camera) to initialize the self-timer.

Event Timeline

Figure 3:
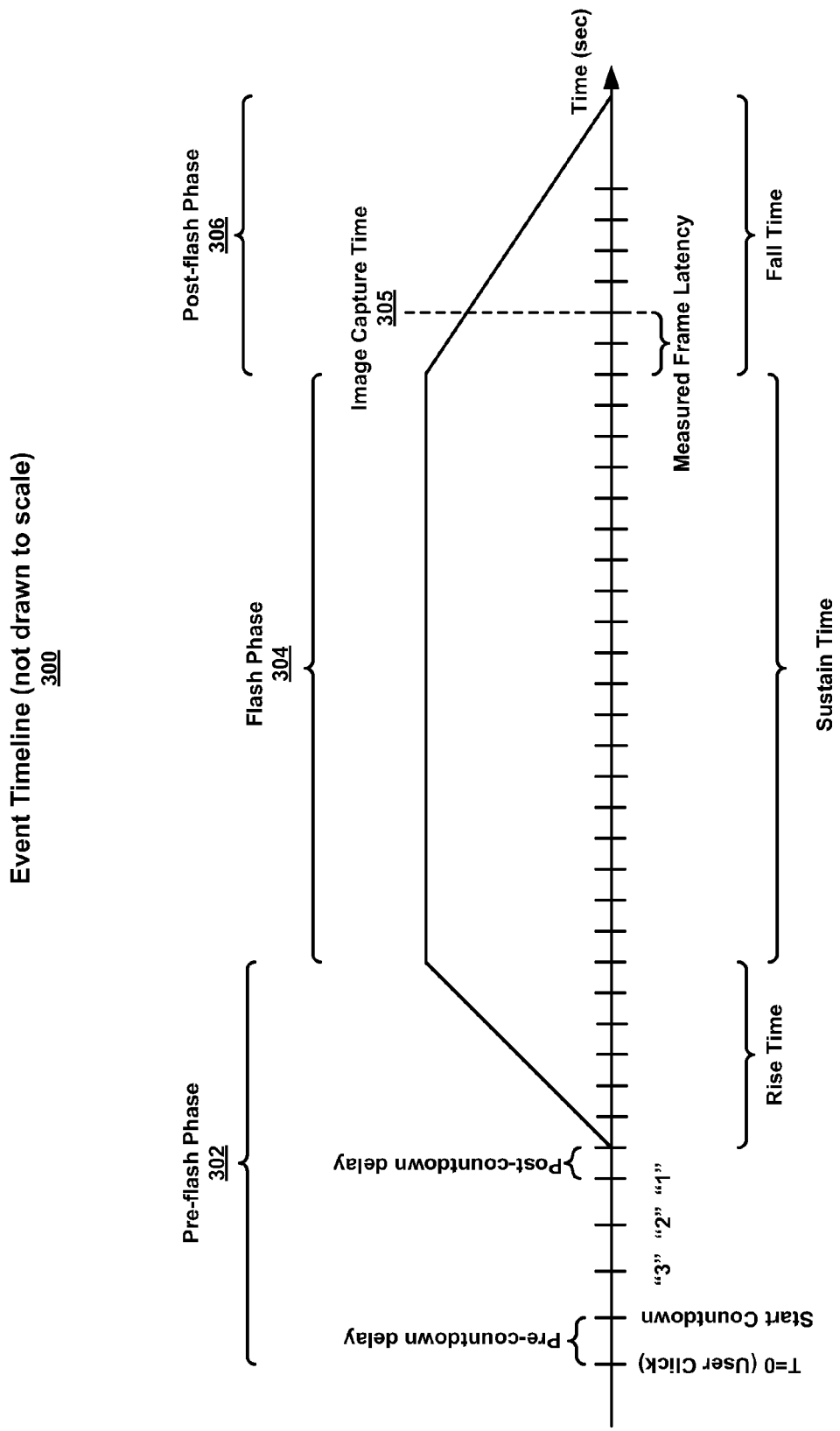
FIG. 3 illustrates an event timeline for an image capture process.

FIG. 3 illustrates an event timeline 300 for an image capture process. It should be noted that the event timeline 300 is not drawn to scale. In some implementations, the event timeline 300 is divided into three phases: pre-flash phase 302, flash phase 304 and post-flash phase 306. The event timeline 300 begins when the user 102 clicks the object 210 to start a countdown sequence (hereinafter also referred to as "the click event"). In other implementations, the event timeline 300 begins programmatically, either directly or through an application programming interface (API). A time delay (e.g., 0.01 seconds) can be added after the click event to ensure enough time to provide feedback to the user before the countdown begins. The feedback can be the playing of an audio file that generates a "click" sound. Following the delay, the countdown sequence begins. In some implementations, the duration of the countdown sequence can be selected by the user 102 via the user interface 200.

FIG. 3 shows a "3-2-1" countdown sequence which provides the user 102 with a visual and/or audio indication of when an image will be captured. In some implementations, this includes presenting numerical values on the display interface 216, as described with respect to FIG. 2. Alternatively, the countdown sequence can be announced verbally (in any language) using a synthetic speech generator. The numerical values can be timed with the playback of audio files that generate audible effects (e.g., "beeps") that coincide with the visual countdown sequence. The countdown sequence allows the user 102 time to prepare for the shot. For example, during the countdown sequence the user 102 can preview their image in the window 204 and adjust their pose or expression, as desired.

After the countdown sequence expires and prior to the flash phase 304, another delay (e.g., 0.01 sec) can be added to ensure that the user 102 is provided with properly timed feedback when the flash is launched. Without the delay, for example, the end of the countdown sequence and the beginning of the flash may be imperceptible to the user, thus detracting from the user's experience.

During the pre-flash phase 302 and just before the post-countdown delay, one or more characteristics of the flash are automatically determined, including but not limited to the duration and intensity of the flash. At this time, a final average video frame latency can also be determined. The intensity of the flash (e.g., brightness of the display device) can be determined based on the ambient light in the environment. The ambient light can be determined from a light sensor in the display device 108 or by averaging the pixel intensities of the live video feed. Based on the measurement of ambient light, the brightness of the display device 108 is set to a suitable value. In some implementations, one or more characteristics of the flash can be changed by the user via a preference pane or user interface element. It should also be apparent that the pre-flash phase 302 can include more or fewer steps then are shown in FIG. 3, depending upon the application.

In some implementations, the color of the screen of the display device 108 is determined prior to the flash. For example, the screen can be set to various shades of white or to another color (e.g., pink, yellow, etc.) which can affect skin tones. In some implementations, the color balance of the image can be determined, for example, by computing a histogram that represents the color distribution of the image to be captured. The color balance can be corrected by changing the color of the screen to a complementary color prior to flash. For example, if the scene is too blue, the screen color can be changed to a yellow or pink tint to compensate for the blue depending on the color balance the user 102 is trying to capture.

In some implementations, the color distribution of the static or nonmoving portions of an image can be used to correct for color balance. Alternatively, the color distributions of the moving portions of the image can be used to correct for skin tone exposure. In other implementations, a combination of the two can be used to correct color balance.

In some implementations, the gamma of the display can be automatically adjusted based on the ambient light and known hardware characteristics, as described in U.S. application Ser. No. 11/153,959, filed Jun. 15, 2005, entitled "Dynamic Gamma Correction,".

In some implementations, the duration of the flash can be divided into three periods: rise time, sustain time and fall time. The rise time period (e.g., 0.04 sec) is the period of time it takes the display device 108 to rise from a nominal level of brightness (e.g., normal viewing brightness level) to a desired level of brightness. The sustain time period (e.g., 0.24 sec) is the period of time where the desired level of brightness is sustained. The fall time period (e.g., 0.24 sec) is the period of time it takes for the level of brightness to fall from the desired level of brightness to nominal brightness. Some digital video cameras include built-in light sensors that enable the camera to adjust to changing lighting conditions. For such cameras, the sustain time can be made sufficiently short so that the camera does not have enough time to adjust to the flash. If the camera adjusts its sensitivity to the flash the resulting image may not be bright enough.

In some implementations, the image is captured during the sustain time period but prior to the fall time period. Due to frame latency, however, the image that is captured may not be the image the user 102 intended to capture. Since video cameras generate streams of images (e.g., 30 frames/sec), there is a frame latency associated with each video frame. This frame latency can be determined during the pre-flash phase 302 and used to determine an image capture time 305. In some implementations, frame latency is equal to the difference between the image timestamp (typically provided by the image capture device 106 at the moment when the video frame is captured) and the time when the frame is actually displayed onscreen. In some implementations, the image capture time 305 is given by the formula $$\text{image\_capture\_time} = \text{rise\_time} + \text{sustain\_time} + \text{frame\_latency}.$$

Prior to the flash phase 304, the frame latency is determined and added to the rise time and sustain time to determine the image capture time 305, which is the time when a "snapshot" of the video stream is taken. For this implementation, the image capture can occur at the beginning of the fall time period.

After the flash phase 304 completes the post-flash phase 306 begins. During the post-flash phase 306 the captured image can be displayed to the user 102, or further processed using known image processing techniques, including those techniques described in co-pending U.S. patent application Ser. No. 11/248,630, filed Oct. 11, 2005, entitled "Image Capture and Manipulation,".

Image Capture Process

Figure 4:
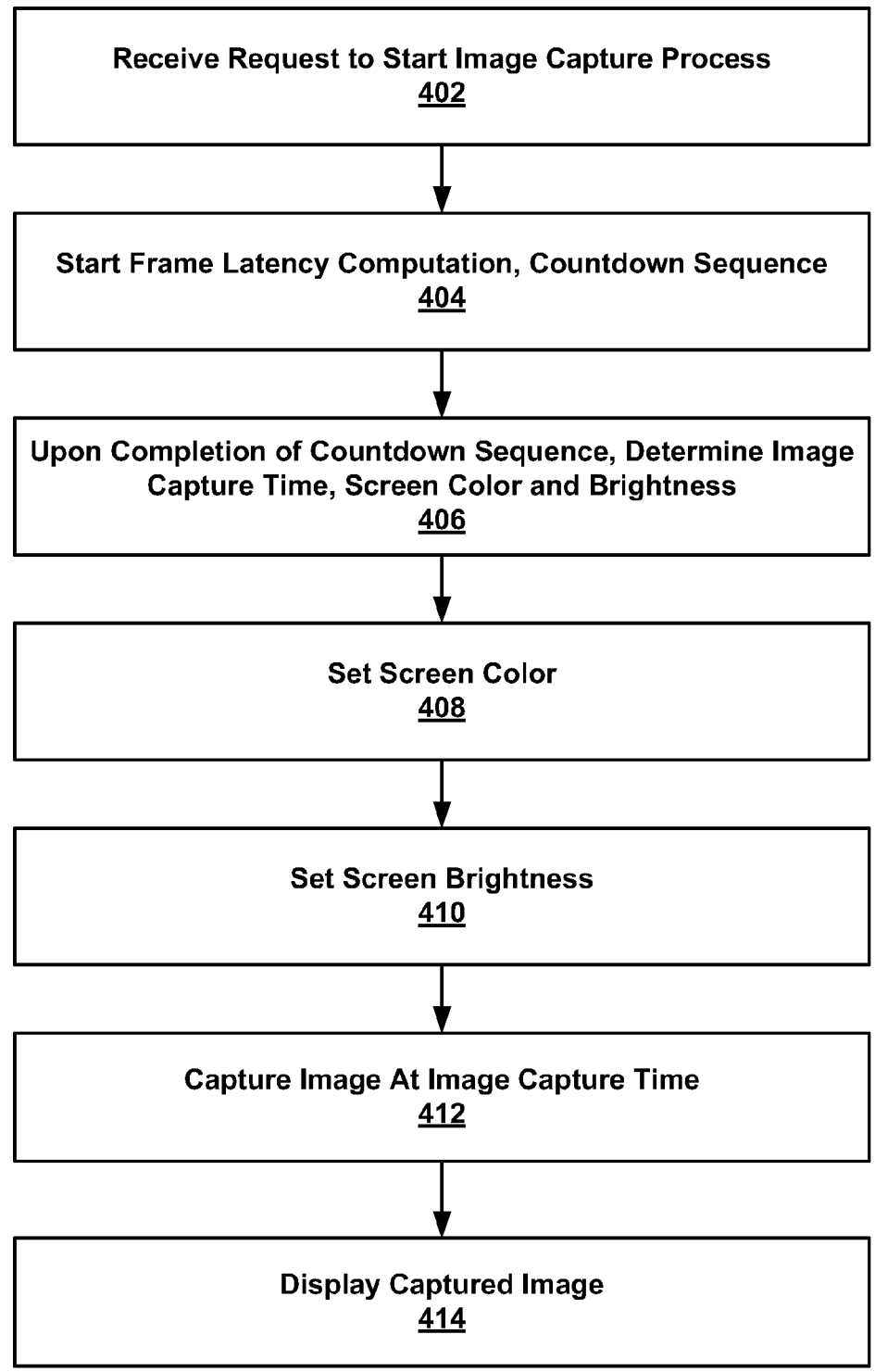
FIG. 4 is a flow diagram of an image capture process.

FIG. 4 is a flow diagram of an image capture process 400. Some of the steps of process 400 can be performed in parallel in multi-threading environments. In some implementations, the steps of process 400 are instructions in a computer-readable medium (e.g., hard drive, memory, buses, waveforms), which, when executed by a processor causes the processor to perform one or more steps of process 400. The steps of process 400 can be implemented in hardware, software, firmware or any combination thereof.

The process 400 begins when a request to initiate an image capture event is received (402). The request can be initiated by a user through an input device (e.g., a mouse click) or programmatically, either directly or through an application programming interface (API). In some implementations, the click event can be transmitted to the user device using known remote control technology (e.g., infrared remote, wireless mouse, etc.). The use of remote control technology provides the user with additional flexibility in capturing images by allowing the user to be farther from the display device and/or image capture device.

When the click event is received the process 400 starts a frame latency computation and a countdown sequence (404). In some implementations, the process 400 can also start measuring the average ambient light of the target's environment. This can be achieved by scanning the live video feed for pixel intensities, or receiving a measurement from an ambient light sensor. Upon completion of the countdown sequence: an image capture time 305 is determined (based in part on a final average frame latency); a final threshold flash brightness is determined based on ambient light measurements; and a screen color is determined based on the desired color balance (e.g., skin tone) in the captured image.

The display device (e.g., display device 108) is then configured to flash based on one or more light characteristics (e.g., intensity, duration, color, etc.). This configuration includes setting the color of the screen of the display device (408) and setting the brightness of the display (410) to simulate a photo flash. In some implementations, the display color and brightness can be controlled via a display driver and/or other operating system components that provide support for color and brightness control.

During the flash phase 304 the target image is illuminated. Depending on the amount of frame latency the image may be captured or "grabbed" at an image capture time 305 which occurs after the flash phase 304 has completed (412). The image capture time 305 should not be confused with the time the image is captured by the image capture device (i.e., captured by the sensor of the video camera), which occurs during the sustain time. For example, during the flash phase 304 the target is illuminated by the flash and an image frame of the illuminated target enters an image processing pipeline. Thus, the flash may appear to be over to the user, but the image remains in the image processing pipeline for the measured frame latency (FIG. 3) until it is captured or grabbed at the image capture time 305. In some implementations, the image capture time 305 is based on average frame latency and the rise and fall times of the brightness level of the display device, as described with respect to FIG. 3.

After the image is captured it can be displayed (414) to the user. The user can save the captured image, compare it to a stored image and/or load the image into an application (e.g., image editor, video conferencing, instant text messaging, etc.) for further processing.

In some implementations, the timestamps of the images in the image processing pipeline are used to determine which image frame will be grabbed from the image processing pipeline. For example, the time when the flash phase 304 begins can be stored as a reference time. The timestamps of each image frame in the image processing pipeline can then be compared with the reference timestamp to determine which frame will be captured or grabbed.

In some implementations, multiple images are captured and displayed to the user so that the user can manually select the best image(s), as described with respect to U.S. patent application Ser. No. 11/248,630, filed Oct. 11, 2005, entitled "Image Capture and Manipulation,". The characteristics of the flash can be manually or automatically adjusted to a different setting for each image. The "best image" can then be manually selected by the user or automatically by the device 104. For example, the histograms of the images can be used to evaluate the quality of the images based on pixel intensity distributions (e.g., image contrast, bright or dark areas, etc.). In some implementations, the user 102 can manually select the "best image" based on visual inspection, and the device 104 automatically stores the selected image as a template for future comparisons with other images.

Image Capture System Architecture

Figure 5:
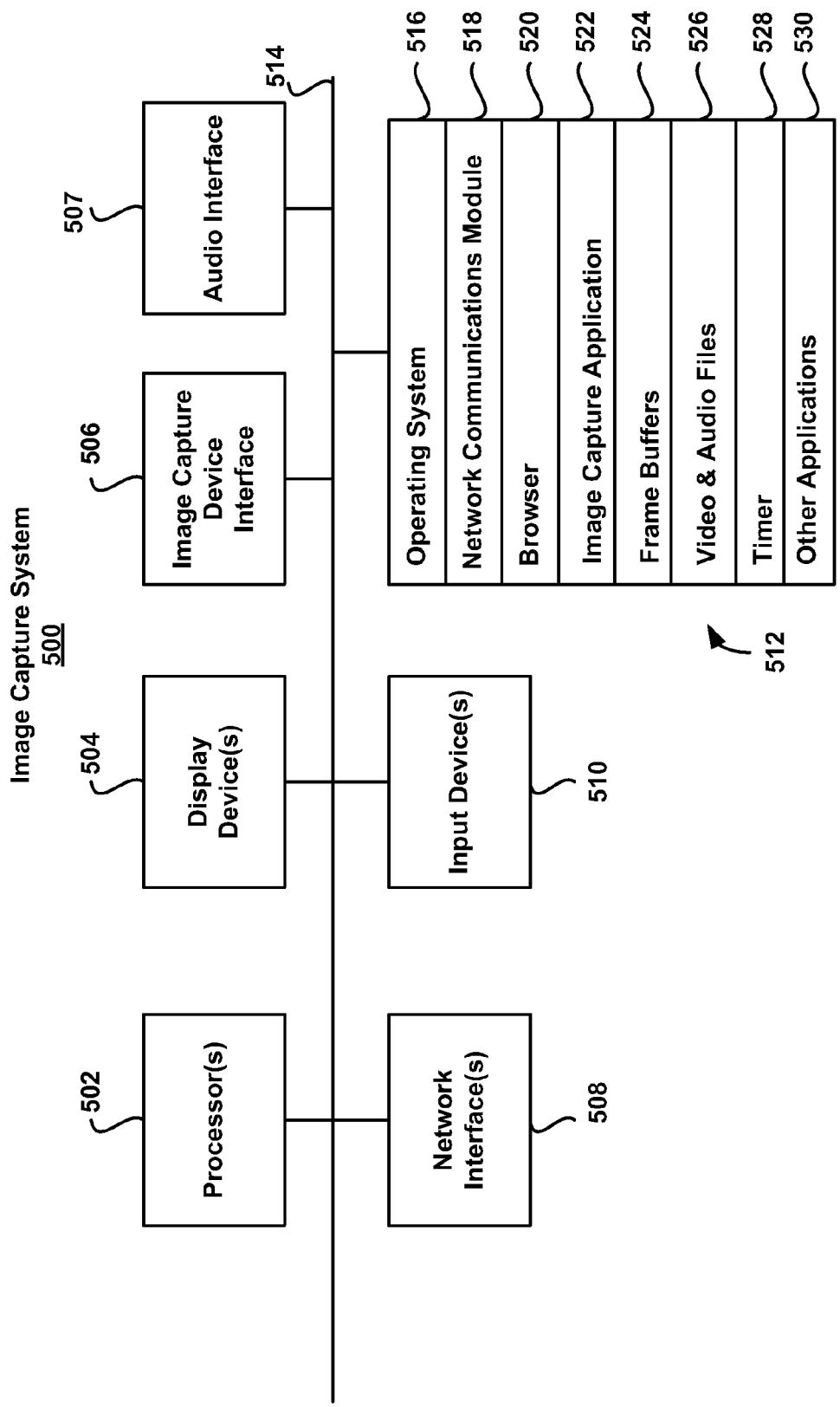
FIG. 5 is a block diagram of an image capture system architecture.

FIG. 5 is a block diagram of an image capture system architecture 500. The architecture 500 includes one or more processors 502 (e.g., CPU), one or more display devices 504 (e.g., CRT, LCD, etc.), an image capture device 506 (e.g., for interfacing with a webcam, video camera, digital camera, mobile phone, etc.), an audio interface 507 (e.g., for interfacing with speakers), one or more network interfaces 508 (e.g., Ethernet connection), one or more input devices (e.g., mouse, keyboard, etc.) and one or more computer-readable mediums 512. Each of these components is coupled to one or more buses 514 (e.g., EISA, PCI, USB, FireWire, NuBus, PDS, etc.). The term "computer-readable medium" refers to any medium that participates in providing instructions to a processor 502 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium(s) 512 further include an operating system 516 (e.g., Mac OS X, Windows® XP, Unix, Linux, etc.) a network communications module 518, a browser 520 (e.g., Safari®, Microsoft® Internet Explorer, Netscape®, etc.), an image capture application 522, frame buffers 524, video and audio files 526, a timer 528 and other applications 530.

The operating system 516 can be multi-user, multiprocessing, multitasking, multithreading, real-time and the like. The operating system 516 performs basic tasks, including but not limited to: recognizing input from input devices 510; sending output to display devices 504; keeping track of files and directories on storage devices 512; controlling peripheral devices (e.g., disk drives, printers, image capture device 506, etc.); and managing traffic on the one or more buses 514. The network communications module 518 includes various components for establishing and maintaining network connections (e.g., software for implementing communication protocols, such as TCP/IP, HTTP, Ethernet, etc.). The browser 520 enables the user to search a network (e.g., Internet) for information (e.g., video files). The image capture application 522 provides various software components for performing the process 400 and other image capture functions, as described with respect to FIGS. 1-4. The frame buffers 524 are for storing and processing captured images. The video files 526 include video sequences for use by the image capture system 100, as described with respect to FIG. 2. The audio files 526 provide various sound effects for use in, for example, the countdown sequence, as described with respect to FIGS. 1-4. The timer 528 is, for example, a software timer that can be used to time various events in the event timeline 300, as described with respect to FIG. 3. The other applications 530 include various applications that can manipulate images (e.g., video conferencing, instant text messaging, image editing, etc.).

Various modifications may be made to the disclosed implementations and still be within the scope of the following claims.

What is claimed is:

1. A method of capturing digital images, comprising:
measuring ambient light of a target environment, the measuring comprising averaging pixel intensities of a video image of the target environment;
determining a flash brightness based on the measured ambient light;
illuminating a target in the target environment with light emitted from a display device, the display device configured to emit the light at the flash brightness; and
capturing a digital image of the illuminated target.

2. The method of claim 1, wherein illuminating the target includes:
determining a flash duration, the flash duration including a rise time, a sustain time, and a fall time; and
emitting the light for the flash duration.

3. The method of claim 2, wherein capturing the digital image includes capturing the digital image at an image capture time, the image capture time determined based on the rise time, the sustain time, and a frame latency.

4. The method of claim 3, wherein the frame latency is determined by a difference between an image timestamp provided by an image capturing device and a time when the video image is displayed on the display device.

5. The method of claim 1, further comprising providing a countdown sequence prior to capturing the digital image.

6. The method of claim 5, wherein providing the countdown sequence includes simulating a cadence of the countdown sequence using a flashing lamp on a user interface displayed on the display device.

7. The method of claim 5, wherein providing the countdown sequence includes verbally announcing the countdown sequence using a synthetic speech generator.

8. A system, comprising:
one or more processors configured to perform operations of capturing digital images, the operations comprising:
measuring ambient light of a target environment, the measuring comprising averaging pixel intensities of a video image of the target environment;

determining a flash brightness based on the measured ambient light;

illuminating a target in the target environment with light emitted from a display device, the display device configured to emit the light at the flash brightness; and capturing a digital image of the illuminated target.

9. The system of claim 8, wherein illuminating the target includes:

determining a flash duration, the flash duration including a rise time, a sustain time, and a fall time; and emitting the light for the flash duration.

10. The system of claim 9, wherein capturing the digital image includes capturing the digital image at an image capture time, the image capture time determined based on the rise time, the sustain time, and a frame latency.

11. The system of claim 10, wherein the frame latency is determined by a difference between an image timestamp provided by an image capturing device and a time when the video image is displayed on the display device.

12. The system of claim 8, the operations further comprising providing a countdown sequence prior to capturing the digital image.

13. The system of claim 12, wherein providing the countdown sequence includes simulating a cadence of the countdown sequence using a flashing lamp on a user interface displayed on the display device.

14. The system of claim 12, wherein providing the countdown sequence includes verbally announcing the countdown sequence using a synthetic speech generator.

15. A non-transitory computer-readable medium having stored thereon instructions operable to cause a data processing apparatus to perform operations of capturing digital images, the operations comprising:

measuring ambient light of a target environment, the measuring comprising averaging pixel intensities of a video image of the target environment;

determining a flash brightness based on the measured ambient light;

illuminating a target in the target environment with light emitted from a display device, the display device configured to emit the light at the flash brightness; and capturing a digital image of the illuminated target.

16. The medium of claim 15, wherein illuminating the target includes:

determining a flash duration, the flash duration including a rise time, a sustain time, and a fall time; and emitting the light for the flash duration.

17. The medium of claim 16, wherein capturing the digital image includes capturing the digital image at an image capture time, the image capture time determined based on the rise time, the sustain time, and a frame latency.

18. The medium of claim 17, wherein the frame latency is determined by a difference between an image timestamp provided by an image capturing device and a time when the video image is displayed on the display device.

19. The medium of claim 16, the operations further comprising providing a countdown sequence prior to capturing the digital image.

20. The medium of claim 19, wherein providing the countdown sequence includes simulating a cadence of the countdown sequence using a flashing lamp on a user interface displayed on the display device.

21. The medium of claim 19, wherein providing the countdown sequence includes verbally announcing the countdown sequence using a synthetic speech generator.

* * * * *